United States Patent [19]

Fanucci et al.

[11] Patent Number: 4,465,708

[45] Date of Patent: Aug. 14, 1984

[54] TECHNIQUE FOR FABRICATING SINGLE MODE LIGHTGUIDE SOOT-FORMS

[75] Inventors: Ronald E. Fanucci, Hamilton Township, Mercer County; Maria J. Yuen, Rocky Hill Township, Somerset County, both of N.J.

[73] Assignee: AT&T Technologies, Inc., New York, N.Y.

[21] Appl. No.: 499,713

[22] Filed: May 31, 1983

[51] Int. Cl.³ ............................................. B05D 1/08
[52] U.S. Cl. .................................... 427/163; 427/423; 65/3.12
[58] Field of Search ................. 427/163, 423; 65/3.12; 156/294

[56] References Cited

U.S. PATENT DOCUMENTS 4,062,665 12/1977 Izawa et al. .......................... 65/3 A
4,345,928 8/1982 Kawachi et al. ................. 65/3.12 X
4,368,063 1/1983 Presby .................................... 65/42

OTHER PUBLICATIONS

Imoto et al., "Modified VAD Method for Optical-Fibre Fabrication" *Electronic Letters,* vol. 17, No. 15, pp. 525-526, Jul. 23, 1981.

*Primary Examiner*—John H. Newsome
*Attorney, Agent, or Firm*—D. J. Kirk

[57] ABSTRACT

A torch (24) used in the Vapor-phase Axial Deposition (VAD) process to form small diameter cores for single mode lightguide preforms. The torch (24) is comprised of a plurality of concentrically mounted, spaced, glass tubes (62, 63, 64, 65, 66) through which reactants and combustible materials are passed. A tapered shroud (68) is mounted about the end of the torch (24) and a shield gas directed along the inner surface thereof to confine and direct the gases and reactants to the surface of the soot form (12).

6 Claims, 4 Drawing Figures

TECHNIQUE FOR FABRICATING SINGLE MODE LIGHTGUIDE SOOT-FORMS

TECHNICAL FIELD

The instant invention is related to the fabrication of lightguide preforms. In particular, the invention is directed to a torch for depositing soot to fabricate a single mode lightguide soot-form.

BACKGROUND OF THE INVENTION

The Vapor-phase Axial Deposition (VAD) method of fabricating multimode optical fibers begins with the deposition of germanium phosphosilicate soot particles, which are formed by the hydrolysis of $SiCl_4$, $GeCl_4$ and $POCl_3$ in an oxy-hydrogen flame, on the end of a rotating vertical bait rod. The bait rod is slowly withdrawn vertically, from a deposition chamber, resulting in a substantially cylindrical, porous, soot-form. The resulting soot-form is subsequently dehydrated and consolidated at an elevated temperature into a clear glass boule. The consolidated glass boule is then stretched into a long rod that is to be used as the core of a preform from which multimode lightguide fiber is drawn. The clad of the preform is formed by the so-called "rod-in-tube" method, which entails the collapse of a silica tube over the core rod which is inserted therein.

However, for single-mode optical fibers, as described in U.S. Pat. No. 4,345,928 to Kawachi et al., which is incorporated by reference herein, the cladding material cannot be fabricated solely by the rod-in-tube method. Because of the small diameter of the single mode fiber core (e.g., 5 to 10 $\mu m$), part of the lightwave traveling therealong finds passage in a portion of the clad near the core. The rod-in-tube method of fabricating all the cladding material results in a fiber that has high attenuation due to the presence of OH in the cladding. Thus, for low loss single-mode fibers made by the VAD method, part of the cladding material must be fabricated, like the core, with a soot deposition step to be followed by dehydration before consolidation into a clear glass lightguide preform.

Typically, the amount of cladding material to be fabricated in this manner must give a soot-form that has a deposited core-to-clad diameter ratio of 3 to 6. Thus, for single-mode fiber fabrication, the VAD method entails the use of several oxy-hydrogen torches for simultaneous soot formation; one torch for the deposition of a core and one or more torches to deposit the clad. After dehydration and consolidation, the resulting clear glass boule or preform is also stretched and extra cladding material is added by the above-described rod-in-tube method to attain the proper clad-to-core diameter ratio to give the desired cutoff wavelength. Typically for a 125 $\mu m$ outside diameter fiber with a cutoff wavelength of 1.15 $\mu m$ and a step index of $\Delta n = 0.004$, the core has a diameter of approximately 8 $\mu m$.

In multimode VAD fabrication, a circular cross-section torch comprised of five concentric, spaced quartz tubes is used to make the soot-forms for fabricating the core of the preform. Two inner tubes deliver the chemicals, $SiCl_4$, $GeCl_4$ and $POCl_3$, while the other three tubes supply $H_2$, Ar and $O_2$ for the oxy-hydrogen flame. Typically, a soot-form that is made with this torch configuration has a core diameter in order of 50 mm. If a similar torch configuration is employed for single-mode fiber fabrication, the overall soot-form which encompasses both the core and clad would be overwhelmingly large (e.g., 300 mm). Such large soot-forms have built-in stresses making handling and sintering extremely difficult. Thus, for single-mode fiber fabrication, a technique must be developed to fabricate the core of the single-mode soot-form having a diameter less than 25 mm.

The Kawachi et al. patent states that the use of a cylindrical torch, even with the smallest chemical delivery orifice or the most convergent flame can only make soot forms that have a core diameter greater than 30 mm. They have resorted to the use of torches that are either rectangular or oval in shape with the chemical delivery port placed eccentric to the center of symmetry of the torch. In such manner, they have reported the growth of soot forms with core diameters of 10 to 20 mm. Unfortunately, the fabrication of the rectangular quartz torches with an offset delivery port is time consuming and expensive.

Accordingly, there is a need for an alternative technique for the fabrication of soot-forms, having small diameter cores, using a cylindrical torch configuration.

SUMMARY OF THE INVENTION

The foregoing problems have been overcome by using a soot deposition torch comprised of a plurality of spaced concentric cylinders through which combustible gases and reactants are passed to form a soot stream; and a tapered shroud through which a shield gas is passed to confine and direct the soot stream at a growing soot-form core.

Advantageously, such a technique has been used to fabricate soot-form cores of less than 17mm in diameter on a regular basis.

DETAILED DESCRIPTION

Figure 1:
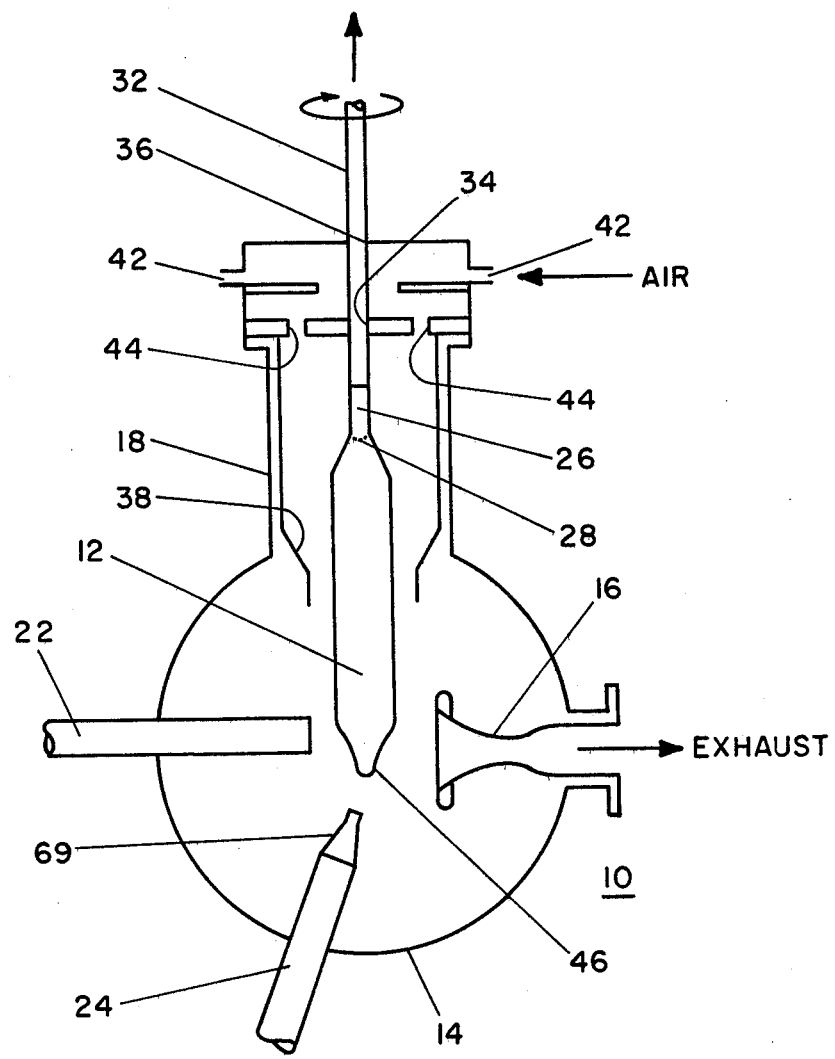
FIG. 1 is a schematic drawing of a Vapor-phase Axial Deposition chamber.

FIG. 1 is a schematic drawing of a VAD system 10 used to fabricate single mode lightguide soot-forms 12. The system 10 is comprised of a substantially spherical housing 14, an exhaust 16, an input section 18, a cladding deposition torch 22 and a core deposition torch 24. The exhaust system 16 is fully described in U.S. Pat. No. 4,435,199 which issued on Mar. 6, 1984 and is assigned to the instant assignee, which is incorporated by reference herein.

In operation, a starting member 26 which may be a solid rod or a hollow glass tube having a rounded end portion 28 is removably connected to a rotatable rod 32 which is mounted for vertical movement towards or away from the center of the housing 14. The rotatable rod 32 with starting member 26 affixed thereto is passed through openings 34 and 36 in the input section 18, through a tapered portion 38, and into the chamber 14. Air is directed into the chamber 14 during the operation via apertures 42,42 and 44,44.

The end 28 of the starting member 26 is initially positioned in the center of the chamber 14 proximate the output ends of the cladding deposition torch 22, the core deposition torch 24 and the input of the exhaust 16. Combustible gases and glass raw material gases, from a source not shown, are then passed through the torches 22 and 24 and the gases ignited. The flame near the ends of the torches 22, 24 is at an elevated temperature which produces a stream of glassy soot which is deposited on the starting member 26 to fabricate the soot-form 12. The torch 24 forms a small radius central core 46 while the torch 22 deposits soot on the lateral surface of the core which becomes a part of the cladding of the final clear lightguide preform.

Figure 2:
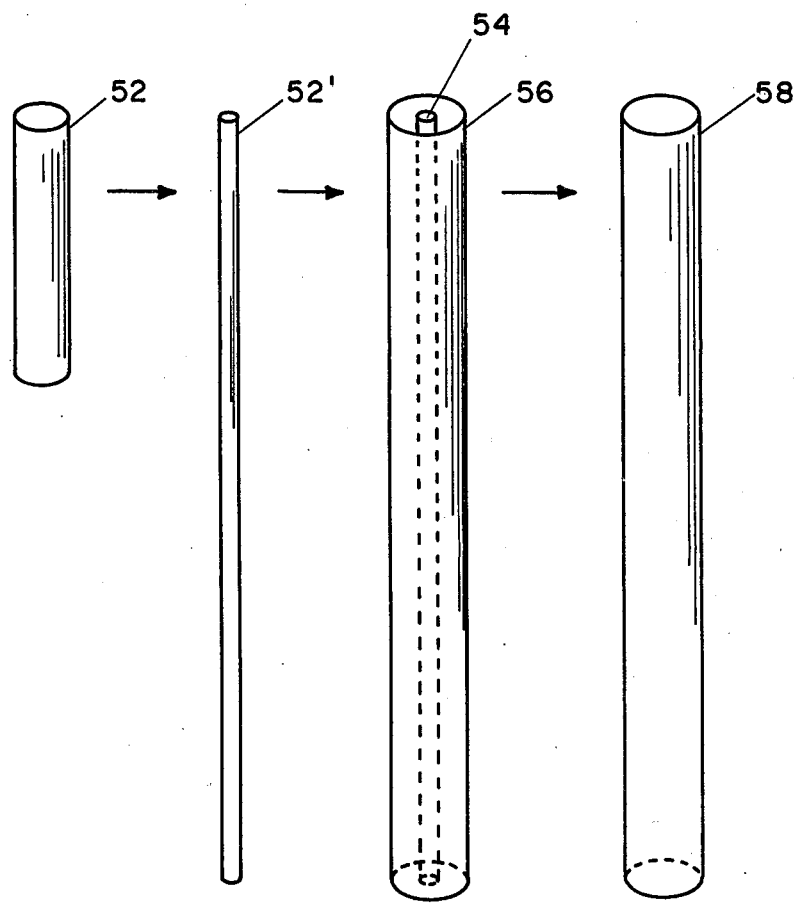
FIG. 2 depicts a sequence used to fabricate a lightguide preform using the rod-in-tube technique.

The porous soot-form 12 may be consolidated into a clear lightguide boule or preform 52 (see FIG. 2) by applying heat thereto using a heating element (not shown) located above the cladding torch 22 as depicted in the above-referred to Kawachi et al. patent. Alternatively, the soot-form 12 may be removed from the chamber 14 and placed in a furnace for a time, and at a temperature, sufficient to perform the consolidation operation.

The clear lightguide preform 52 is then stretched to form an elongated rod 52' which conforms to the inner diameter 54 of a silica tube 56. The elongated rod 52' is inserted and sealed in the silica tube 56 and subjected to elevated temperatures, so as to form a single mode lightguide preform 58. The ligthguide preform 58 is then drawn by a conventional fiber drawing apparatus (not shown) to form a single mode lightguide fiber.

Figure 4:
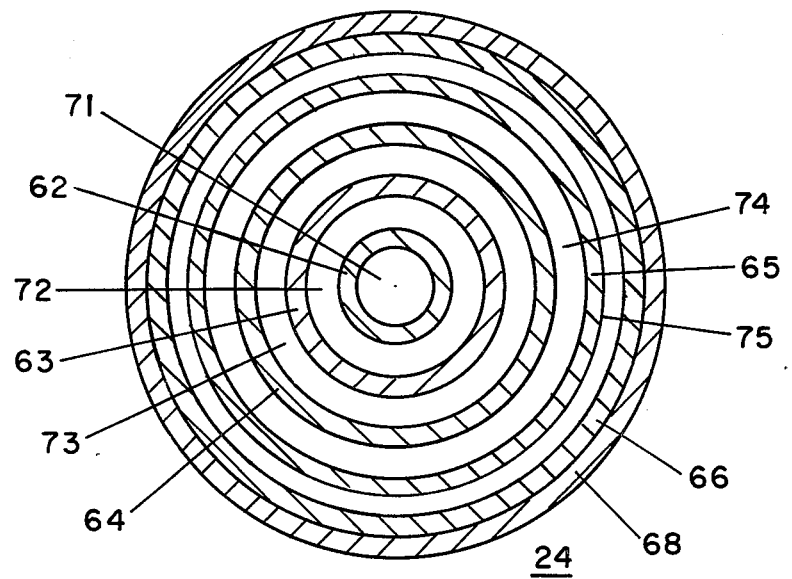
FIGS. 3 and 4 are cross-sectional views of the instant torch used to fabricate a lightguide soot-form.
Figure 3:
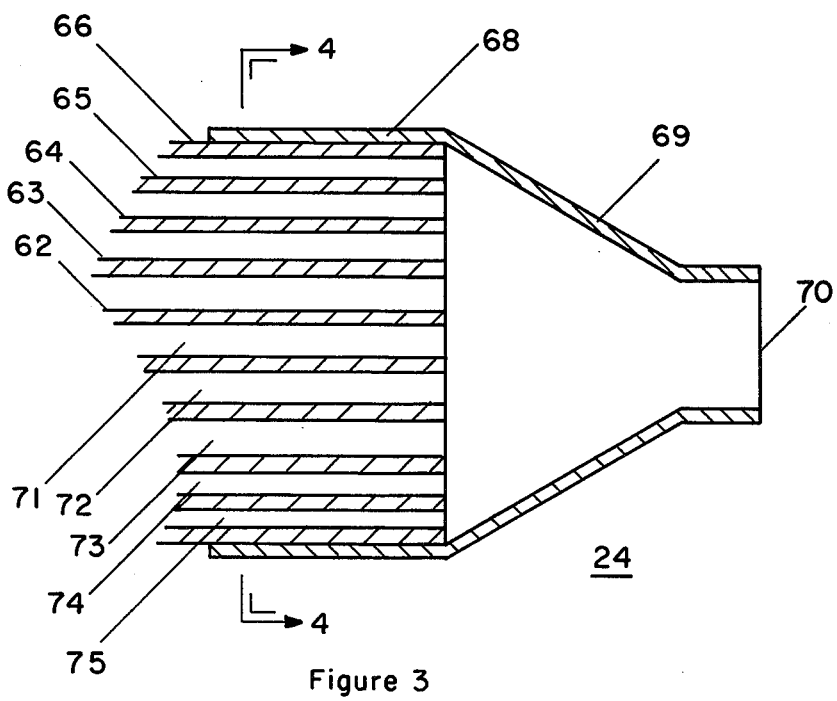

As hereinbefore indicated, it is most important to deposit a small diameter core in order to provide the proper clad-to-core ratio in the resulting lightguide preform 58 and the fiber drawn therefrom. The instant torch 24, shown in cross-section in FIGS. 3 and 4, advantageously provides such a capability. FIG. 3 shows the torch 24 having a plurality of spaced, concentrically mounted quartz tubes 62, 63, 64, 65 and 66 with a quartz shroud 68, having a tapered output end 69 with a discharge opening 70 therein, mounted about the end of the outermost tube 66. The tubes 62, 63, 64, 65 and 66 define volumes 71, 72, 73, 74 and 75.

In an exemplary embodiment $SiCl_4$+ $GeCl_4$+Ar was directed through the center volume 71, $H_2$ through volume 72, Ar through volume 73, $O_2$ through volume 74 and air through the outer volume 75. Advantageously, the air passing through the volume 75 forms a shield about the gases and reactants passing through the inner volumes 71 to 74. Furthermore, the gas shield in combination with the tapered end 69 of the shroud 68 unexpectedly resulted in the very small diameter cores required in single mode lightguide fiber applications. Although the exemplary embodiment makes use of air as a shield gas other gases such as N, He, Ar or the like may be used.

In the exemplary embodiment, a portion of the shroud 68 is mounted about and in contact with the outer tube 66. However, it is also contemplated that the shroud 68 could be removed and the output end of the outer tube 66 be extended and formed to the desired taper 69.

With a cylindrical shroud (i.e., not tapered), the use of a gas shield can effectively reduce the diameter core of the soot-forms 12 to approximately 26 mm. However, the use of a gas shield in combination with a tapered shroud 68 substantially decreases the core diameter of the soot-form as shown in Table I. It can be seen that the tapered shrouds 68 have effectively converged the flame diameter and consequently, have allowed the deposition of very small diameter cores on the soot-forms 12. In the exemplary embodiment a core having a diameter of 16.8 mm was deposited using a tapered shroud 68 having a discharge opening 70 diameter of 12 mm.

Table I presents data on three shrouds of different designs, showing that the use of tapered shrouds 68 allows a significant convergence in the flame diameter. All of the tubes 62 to 66 are made of quartz and are approximately 1 mm thick. The inner diameter of the tubes 62, 63, 64, 65 and 66 is 2, 6, 10, 14 and 18 mm, respectively.

The flame observed with the cylindrical shroud (i.e., no taper) measures 14 mm in width, while the tapered shroud 68 with an opening 70 of 17 mm in diameter gives a flame with a width of 8 mm; further reduction to 5.6 mm is seen with the tapered shroud having a 12 mm diameter opening. With the flame convergence, there is a corresponding decrease in the diameter of the resulting cores of the soot-forms 12. The untapered cylindrical shroud results in a soot-form core having a diameter of 27.1 mm, while the tapered shrouds 68 having discharge openings 70 of 17 mm and 12 mm give diameters of 22.5 mm and 16.8 mm, respectively.

TABLE I

|  | No taper | 17 mm | 12 mm |
| --- | --- | --- | --- |
| Shroud | cylinder | tapered | tapered |
| $SiCl_4$ | 80 cc/min Ar @ 38.2° C. Saturation Temp. | | |
| $GeCl_4$ | 40 cc/min Ar @ 26.5° C. Saturation Temp. | | |
| Ar | 1.5 liters per/min | | |
| $O_2$ | 3.5 liters/min | | |
| $H_2$ (liter/min) | 2.75 | 2.5 | 2.0 |
| Air (liter/min) | 14.0 | 14.0 | 15.0 |
| Flame diameter (mm) | 14.0 | 8.0 | 5.6 |
| Soot-form Diameter (mm) | 27.1 | 22.5 | 16.8 |

In an additional exemplary embodiment a torch 24 having smaller dimensions than shown in Table I was implemented. That torch 24 is also comprised of a plurality of spaced, concentric quartz tubes 62 to 66 having an overall outer diameter of 14.25 mm and an inner diameter of the tube 62 being 0.7 mm. The tubes 63 to 66 have a wall thickness of 0.9 mm, while the inner tube 62 is 0.5 mm thick. With the use of this torch 24 a soot-form 12 having a core diameter of 16.1 mm with variations of ±3.0% is routinely achieved. The following chemicals are used in this torch:

$SiCl_4$: 56 cc/min of Ar with 38.3° C. saturation temperature $GeCl_4$: 28cc/min of Ar with 26.5° C. saturation temperature $H_2$: 1.4 liters/min $O_2$: 3.0 liters/min Ar: 1.5 liters/min Air: 6.5 liters/min Accordingly, by combining the use of an air shield and a tapered shroud 68, it is possible for a conventional circular quartz to deposit soot-forms 12 with a core diameter smaller than 17mm. The use of the tapered air shield provides a vehicle for the efficient removal of soot particles from the deposition surface. It has the added advantage of preventing soot deposition on the walls of the shroud 68 and thus, allows the use of a tapered shroud for flame convergence. All these factors contribute to the reduction of the core diameter of the soot-form 12.

It is to be understood that the embodiments described herein are merely illustrative of the principles of the invention. Various modifications may be made thereto by persons skilled in the art which may embody the principles of the invention and fall within the spirit and scope thereof.

What is claimed is:

1. A method of forming a core of a single mode lightguide soot-form, comprising the steps of:
   directing combustible gases and reactants through a plurality of spaced, concentric cylinders;
   igniting the combustible gases to form a flame to heat the reactants to form a soot stream;
   forming a tapered shield of gas at the output of the concentric cylinders to confine and direct the soot stream at a starting member to initially deposit the soot-form core thereon; and
   moving the starting member, with the soot-form core thereon, relative to the soot stream while depositing soot on the core to increase the length thereof.

2. The method as set forth in claim 1 comprising the step of:
   directing a stream of soot onto the outer surface of the moving soot-form core to form a cladding about the soot-form core.

3. The method as set forth in claim 2, comprising the steps of:
   consolidating the soot-form core with the cladding thereon into a non-porous glass billet.

4. The method as set forth in claim 3, comprising the steps of:
   stretching the billet into an elongated rod;
   positioning the rod inside a glass tube; and
   heating the tube, with the rod therein, to form a single mode lightguide preform.

5. The method as set forth in claim 4, comprising: heating the preform to reflow a portion thereof; and drawing a lightguide fiber from the reflow portion.

6. A method of fabricating a single mode lightguide preform, comprising the steps of:
   (a) directing combustible gases and reactants through a plurality of spaced, concentric cylinders;
   (b) igniting the combustible gases to form a flame to heat the reactants to form a soot stream;
   (c) forming a tapered shield of gas at the output of the concentric cylinders to confine and direct the soot stream as a bait rod to fabricate the soot-form;
   (d) consolidating the soot-form into a clear glass billet;
   (e) stretching the billet into an elongated rod; (f) positioning the rod inside a glass tube; and (g) heating the tube, with the rod therein, to form the single mode lightguide preform.

* * * * *

UNITED STATES PATENT AND TRADEMARK OFFICE
CERTIFICATE OF CORRECTION

PATENT NO. : 4,465,708
DATED : August 14, 1984
INVENTOR(S) : R. E. FANUCCI and M. J. YUEN It is certified that error appears in the above—identified patent and that said Letters Patent is hereby corrected as shown below:

Column 3, line 24, "ligthguide" should read --lightguide--. Column 4, line 56, "quartz" should read --quartz torch--.

Claim 6, line 18, "as a" should read --at a--; lines 21-24, "rod; (f) positioning the rod inside a glass tube; and (g) heating the tube, with the rod therein, to form the single mode lightguide preform" should read --rod;

(f) positioning the rod inside a glass tube; and (g) heating the tube, with the rod therein, to form the single mode lightguide preform--.

Signed and Sealed this

Eighth Day of January 1985

[SEAL]

Attest:

Attesting Officer

GERALD J. MOSSINGHOFF

Commissioner of Patents and Trademarks